Oct. 27, 1942.   L. A. COLLINS   2,299,738
METHOD OF MAKING AND RE-CREATING RECORDS
Filed Sept. 25, 1939   3 Sheets-Sheet 1

INVENTOR
Lee A. Collins

Oct. 27, 1942.   L. A. COLLINS   2,299,738
METHOD OF MAKING AND RE-CREATING RECORDS
Filed Sept. 25, 1939   3 Sheets-Sheet 2

Oct. 27, 1942.  L. A. COLLINS  2,299,738
METHOD OF MAKING AND RE-CREATING RECORDS
Filed Sept. 25, 1939  3 Sheets-Sheet 3

INVENTOR
Lee A. Collins

UNITED STATES PATENT OFFICE 2,299,738

METHOD OF MAKING AND RE-CREATING RECORDS

Lee A. Collins, Louisville, Ky.

Application September 25, 1939, Serial No. 296,482

10 Claims. (Cl. 178—5.6)

The invention is for methods of making and re-creating records of sound, optical effects, other representations, and for novel records consisting of duplicate renditions running in opposite directions on a film or other suitable material, for several new and useful purposes.

The records may be of sound alone, picture effects alone, or they may be both sound and picture effects, oppositely arranged for simultaneous re-creation. Also, they may consist of more than one pair of records of like kind for sound, pictures, and for a combination of both.

The invention has great novelty in always being automatically ready to re-create a duplicate rendition from the outside of a record roll. This eliminates rewinding at the finish of a rendition and makes practical renditions lasting 24 hours or longer. This saves many hours of time that would be lost in rewinding record rolls not having duplicated records in opposite directions, and solves the problem of making and re-creating lengthy renditions in a highly efficient manner for all kind of entertainment and commercial purposes. It eliminates interruption in changing records which detract from renditions requiring rewinding or changing after a few minutes. Also, many other advantages are presented when the records of the present invention are of short length.

The preferred embodiment of the invention is a photographic record on film for both sound and optical effects, but it is intended to include mechanical and all other types of records in the methods and the invention. Also, in order to further broaden the application of the invention it may consist of two separate record materials fastened together in some suitable way to arrange the records of each in opposite directions and in duplicate to effect re-creating of the same re-creation from either end of the roll. Furthermore, the record materials may have either sound or optical effects, or both, on one or both surfaces in any suitable arrangements to provide for recreation of identical renditions from each end.

The invention has special advantage in the radio broadcasting station where it is desirable to broadcast sound records without annoyance in switching from one record to another to complete a program as has been the case in the past when records playing 15 minutes were used. These old types of records have been of the mechanical disc type and present many annoyances among which is being unable to delete parts thereof to suit local requirements without the necessity of tediously finding the part and then jumping the reproducer manually to the finishing part. In the use of the present invention it is possible to delete and patch the record, or to delete and add a connecting program or announcement pertaining thereto. Furthermore, the part to be deleted is blackened or whitened out and at this beginning an announcement or other sound matter may be broadcast by the use of the microphone which can be automatically cut in and out by markings or perforations in the record for actuating a photo-cell. Also, a signal to the operator can be actuated in like manner in lieu of controlling the microphone and other reproductions may be electrically operated by the markings or perforation on the film. Also, the signal actuated by the film marking or perforations may be watched by the operator for speaking into a microphone the exact wording as a substitute for the deleted part. These advantages make possible more perfect programs and they may last many hours or the entire day without interruption and then they are automatically ready for re-use, without rewinding, at the same station or at another station to which they may be sent. It is apparent that any suitable sound broadcast can be made thru the microphone by proper signal to musicians and others when the part to be deleted is reached on the sound record and it may be discontinued on another signal when the deleted part of the record is finished and the record is to continue the re-creation.

The invention opens up new fields in broadcasting and when a complete day or operating period is made in advance on the record it makes an automatic broadcasting station. Also, it makes practical the broadcasting of lengthy moving pictures by television scanning apparatus and other sending means and the records are always ready for re-use without rewinding. The accompanying sounds may be included with the moving picture effects and when of sufficient length to include the complete program for an entire day it makes an automatic television station as well as an automatic broadcasting station for sound effects. It is apparent that automatic starting and stopping means may be included for remote control of the sending stations and records when found desirable.

The invention has wide application and in addition it includes the making and reproduction of received television pictures and sound. Also, it includes registering thru electrical means in single width the component parts of moving pictures, enactments and other optical effects as they take place and are sent by broadcasting, or by wired circuit, or by co-axial cable. Such records are similar in appearance to sound records and are capable of being re-created into the original visible effects by electrical translating means such as television scanners and the like. Also, when desired, it includes sound records relating to both types of television picture records. Other records in duplicate and running in opposite directions are easily made for re-creating without rewinding.

Since television pictures or their modulations or signals do not re-create successfully into images or views at great distances when sent by radio, it is an intent of the present invention and methods to make the records over wired circuit or by co-axial cable in order to re-send locally in a highly efficient manner. The records may be made in duplicate as they are registering the received impulses from the distant point and later transposed or reversed to make available for re-creation from both ends when used in the sending station or elsewhere, as before stated, sound may be included with the television pictures whether they are sent and received in full area or in the single line method for translating back into full area views. In like manner to the picture records the sound records may be made in duplicate as they are received for later reversing the ends to avoid rewinding of rolls for again re-creating. Duplicate records can be made of the records after they are placed in reversed running order. In lieu of making two records simultaneously during reception, a single record may be made and later duplicated and placed in reverse order for re-creating from both ends.

In lieu of a parent sending station transmitting pictures and sound to other stations as they are enacted, it is an intent to make the records and send them to the various stations for re-creating back into the original effects. Such a method will also include records of pictures in single line effect for translating back into the full area effect as will be understood by those skilled in the art. The records can be made in duplicate or they may be made single at the parent sending station or recording place. Again, they can be duplicated records with the ends reversed as above described. When they are made only in the form of a master or original record by the parent station or studio and sent to other stations it can be made practical to complete as desired at these points. Furthermore, a great number of the same renditions or recordings can be made simultaneously for sending to numerous stations. The records may be of pictures alone when desired, and the sound can be transmitted from the parent station at the same time the picture records are being re-created at the local station. Also, it may be found desirable to use only the pictures without sound records. It is apparent that the same enactments of pictures and sound can be transmitted while the records are being made.

The present invention contemplates photographing or otherwise recording television picture effects in more than one line at a time when it is found desirable for more perfect detail and speed of the pictures. This necessitates more than one wired circuit channel, as well as a number of radio frequency channels and amplifiers in radio sending or by co-axial cable sending. Also, for local or short distance recording it requires more than one wired circuit with the corresponding number of amplifiers as will be understood by those skilled in the art. When a number of picture lines are made simultaneously side by side to complete the pictures they can be duplicated for reversing and completing films or records as herein described. Likewise, duplicate sets of the pictures can be made simultaneously and severed apart and reversed for effecting re-creation from both ends as herein described. Preferably, positive prints are made for re-creating when the pictures are received in negative form. This method is applicable to the various ways of using the records for transmission and for receiving. Also, it is applicable when pictures are made purely for projecting purposes independent of distance transmission.

Another object of the invention is to transmit or reproduce in all of the various methods more than one rendition from a single record or joined records simultaneously. This has particular advantages in a parent transmission station sending the same program simultaneously to a great number of stations. Also, it has particular advantage when a great number of stations are receiving from a parent station but some are receiving different programs. In the latter case the record would contain different programs for the various stations. When all stations are receiving the same program it may be found advantageous to have a great number of the same records on one, or joined materials running at uniform speed to suit requirements. A separate recording may be provided for each station or several stations may be receiving their programs from the same recording on the record material to suit circuit or sending channels. In any event the record material may contain any desired number of programs whether they be the same or different renditions. Also, the plurality of programs reproducing simultaneously are advantageous in distributing over a wired circuit in a building and the like in order to give the various classes of pictures, sound and pictures, or sound effects alone.

When a number of renditions are desired on a limited space or small record material one record may be superimposed on the other. Employing this method to the present invention is accomplished by superimposing over the photographic record its duplicate record beginning at the ending of the first record. Also, the superimposing may be an entirely different selection and it can start at the beginning of the first rendition or record, or it can start at the ending of the first selection or record. Furthermore, any suitable number of selections or records may be superimposed on each with each selection in duplicate and running in opposite directions along a film or other material in order to re-create exactly the same selection or selections from whichever end that happens to be outside of the roll. It will be understood that any suitable arrangement of the selections may be superimposed on the other in the making, and then re-created in the various ways known in the art such as by a light source and the photo-electric cell responsive to the selected ray emanations for each of the records.

A still further object of the invention is to include more than one rendition or program in the same running space along the record material as a continuation of a program that may be finished at some later time, or as an entirely separate rendition that may be finished immediately after the finish of the rendition ahead.

There may be an intervening space between the renditions, or there may be connection between each with fade in and fade out shadings or other means to accomplish such results. This arrangement has great usefulness when long programs or renditions are desired, particularly in the broadcasting station for both sound and pictures. A duplicate is made of these continuous renditions for running in opposite direction to enable re-creation from both ends of the record roll.

Other modifications may be made in the reproduction of the records among which is using separate records for the sounds and separate records for the picture effects of full area and of the single line and synchronizing by means of suitable coupling such as gearing, shafting or belting and the like. This will be advantageous for some uses, particularly in synchronizing sound records with television records of the single line type which require a different speed than sound records. A different gearing ratio or speed can be effected in coupling the two records both in the making and reproduction and synchronization will be maintained. Duplicate records of each of the separate records are made and are preferably on each record material of like kind.

The invention offers further novelty since a number of sound records can be made on a film or other material that would be required for a single sound record. Sound records are of narrow width on a film or material that requires the necessary width to give the proper rigidity and the film has sufficient space to include the duplicate record or records without additional cost in the material. The same applies when single line type television records are made. Also, when the two are combined. Furthermore, small moving pictures or other pictures can be included on a narrow film of the required width to give rigidity and they will be in duplicate and in reversed running along the length of the film. Again, the records can be made on both sides or surfaces of the film or other material in reversed running order to make available for playing the sound records and projecting the picture records either separate or together. The initial cost in duplicating the records in reversed order is small compared to the saving in final operating costs.

Among other attainments of the invention is the saving of wear and tear on the record materials accomplished by the elimination of rewinding at the finish of a program. The wear is reduced one half under old methods of rewinding a record roll for the next time the same rendition is given. Furthermore, the renditions are more perfect over the same period of usage since at least two records are made and the use of any one is just one half what it would be under old methods of using a single record. This degree of quality applies to both the photographic type and other types of records. It has special advantage when applied to the mechanical type of records requiring a needle in the re-creation which has frictional engagement with the record and wears away the recordings.

Still further lasting quality is attained when the records are made in more than one duplicate pair of renditions. As the number increases the wear on any one is shortened in exact proportion. The increased width of the record is negligible in cost compared to the final saving in wear in reproducing sound and television records in single line type. In the case of moving pictures intense heat is exposed to each of the picture frames and the lasting quality will be prolonged in exact accordance to the number of duplicated pairs, and it may be found desirable to make such films with a reasonable number of duplications, especially if they are of small size.

The invention gives high quality re-creations of both sound and optical effects longer than old type records, re-creates lengthy records automatically without interruption at the place of operation or to distant points and offers many other advantages which opens new fields of usage of records.

To further effect automatism of the records for certain uses it is an intent to provide the ending of each rendition with some sort of means to automatically stop the mechanism and shift it to the next rendition. This is effected by cuts in the record material for causing contact and closing circuits, or by using transparent or darkened markings for effecting photo-electric cells and relays in several of the well known ways. Furthermore, the passing of the end of the record material over or from under a mechanical contact will cause stopping of the mechanism and breaking of the circuit or circuits controlling the reproducing means and the transmission apparatus. Such means are desirable for automatic broadcasting stations and other transmission methods, but are not essential and will not be included in or on the records when not needed, particularly where an operator is employed.

In the drawings:

Figures 1 to 38 inclusive show short records severed from long records.

Figures 39 to 42 inclusive show apparatus for making records.

Figure 43 shows a short record severed from a long record made by the camera in Fig. 42.

Figure 44 shows a short record severed from a long record with pictures in reversed order and made from the record in Fig. 43.

Figure 45 shows sound recording mechanism connected to the same type of moving picture camera shown in Fig. 42.

Figure 46 shows a short record severed from a long record made by the camera and sound recording apparatus shown in Fig. 45.

Figure 47 shows a short record severed from a long record with pictures in reversed order together with sound records in reversed order and made from the record in Fig. 46.

Figures 48 to 53 inclusive show the various kind of apparatus used in reproducing sound records and picture records in the accompanying drawings.

Figure 54 shows a short record material severed from a long material with a plurality of recorders for making records close together.

Figure 55 shows a short record material severed from a long material having a plurality of records thereon with a group of reproducers.

Figure 56 shows images alternated between in reversed running order with sound records alongside in reversed running order.

Figure 57 shows a cathode ray tube registering its light variations crosswise on a sensitized film.

Figure 58 shows duplicate records in reversed running order made crosswise along a film.

Figure 59 illustrates re-creating crosswise records with a cathode ray tube projecting its rays through the recordings onto a photoelectric cell.

Figure 60 illustrates crosswise records made between each.

Identical elements in the several figures are identified by like reference characters.

Figures 1, 2, 3, 4, 5, 11, 12, 13:
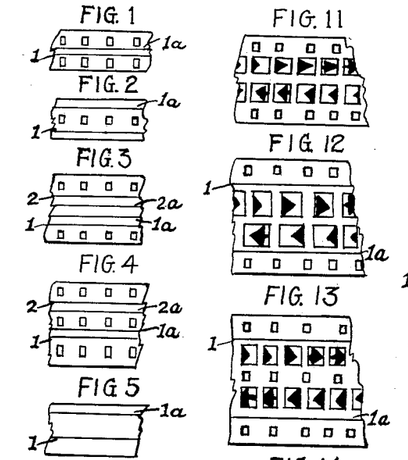

Referring now more specifically to the drawings:

Figure 1 illustrates a pair of identical sound records 1 and 1a running in opposite directions along the length of a film having two sets of sprocket holes.

Figure 2 shows the same records in Figure 1 on a film having a single set of sprocket holes.

Figure 3 illustrates how a great number of sound records may be on a single record film. The numerals 1 and 2 indicate different records and each are duplicated and run opposite to the first records and are indicated by the numerals 1a and 2a. Any desired number may be on such films and each pair of the records may be different or identical for the various purposes set forth elsewhere in these specifications.

Figure 4 is the same as Figure 3 except it has three sets of sprocket holes.

Figure 5 is the same as Figure 1 except it is without sprocket holes. Additional sound records may be on such a film when it is of greater width, or the records are made closer.

Figures 6, 7, 8, 9 and 10 are the same records as shown in Figures 1, 2, 3, 4 and 5, respectively, but they are made on both surfaces of the film as shown where the ends of the short lengths of film are folded over.

Figure 11 illustrates a pair of identical moving pictures, which run in opposite directions to each along the length of the film.

Figure 12 is the same picture record as Figure 11 with an added pair of sound records running in corresponding directions to each of the pictures for producing sounds relating to the pictures.

Figure 13 is the same as Figure 12 except it has an added set of sprocket holes between the two sets of pictures in order to avoid buckling of the film when it is of great width.

Figures 6, 7, 8, 14, 15:
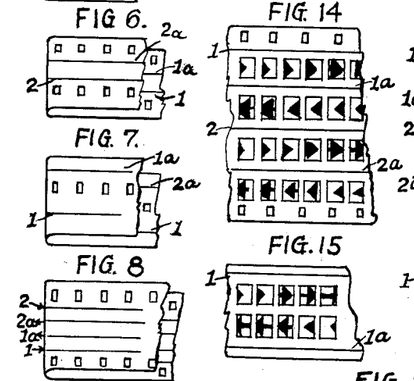
Figure 9:
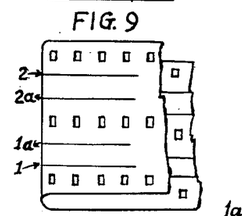
Figure 10:
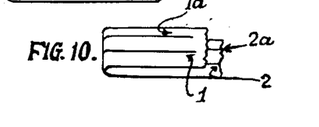

Figure 14 illustrates how multiple pairs of pictures and corresponding pairs of sound records may be made on a film. Each pair of records may be different renditions or they may be identical renditions for various uses as set forth elsewhere in these specifications. Any desired number of picture and sound records may be added when the film is of greater width. Also, any desired number of sprocket holes may be used to avoid buckling of the film.

Figure 15 illustrates how sound and picture records of the invention may be placed on a film or other material without sprocket holes. Additional sets may be added and the width of the material increased.

Figures 16, 17, 18, 19 and 20 are the same types of picture records, and picture and sound records as shown in the drawings bearing Figures 11, 12, 13, 14 and 15, respectively, except that records are made on both surfaces as shown where the ends of each short length is folded over.

Figure 21 illustrates single sets of pictures on each surface of a film and each set runs in opposite directions along the length of the film. Both sets of pictures are identical renditions.

Figure 22 illustrates single sound records on each surface of a film, both being identical renditions and running in opposite directions along the length of the film.

Figure 23 is a combination of the picture and sound records in Figures 21 and 22, the picture and sound records on one surface being identical to the picture and sound records on the other surface but running in opposite directions.

Figure 24 illustrates a pair of photographic or other type recordings of moving pictures, still pictures, television pictures, and the like, which are capable of being translated back into picture effects. The translating may be into screen effects such as produced by the various types of television receiving apparatus, or it may be by re-photographing into pictures on a suitable film for later projecting onto a screen for various purposes.

Figure 25 is the same as Fig. 24 with related sound records added and running in the respective directions to each picture record recording or photographing.

The picture records in Figures 24 and 25 are equivalent in final results to the regular types of picture records illustrated in all such drawings, and any desired number may be placed on the film or material in exact arrangement and combinations as set forth in the drawings and specifications. Therefore, additional drawings showing such modifications for the records in Figures 24 and 25 are not required. The desired number of sets of sprocket holes may be used.

Figure 26 illustrates a sound record with its duplicate record superimposed thereon and running parallel in an opposite direction.

Figure 27 illustrates a pair of moving pictures running in opposite parallel directions, one pair being superimposed on the other.

Figure 28 illustrates a pair of sound records superimposed on a pair of moving picture records, or vice versa. The respective records being identical and running parallel in opposite directions.

Figure 29 illustrates records of picture representations of the type shown in Fig. 24, but one record is superimposed on the other.

Figure 30 is exactly the same record in Fig. 24 with added sound records 1 and 1a running in opposite directions along the length of the film, and superimposed on the picture records, or vice versa.

Figures 31, 32, 33, 34, 35, 36, 38, 39, 40, 41, 42, 43, 44, 45, 46, 47, 48, 48A:
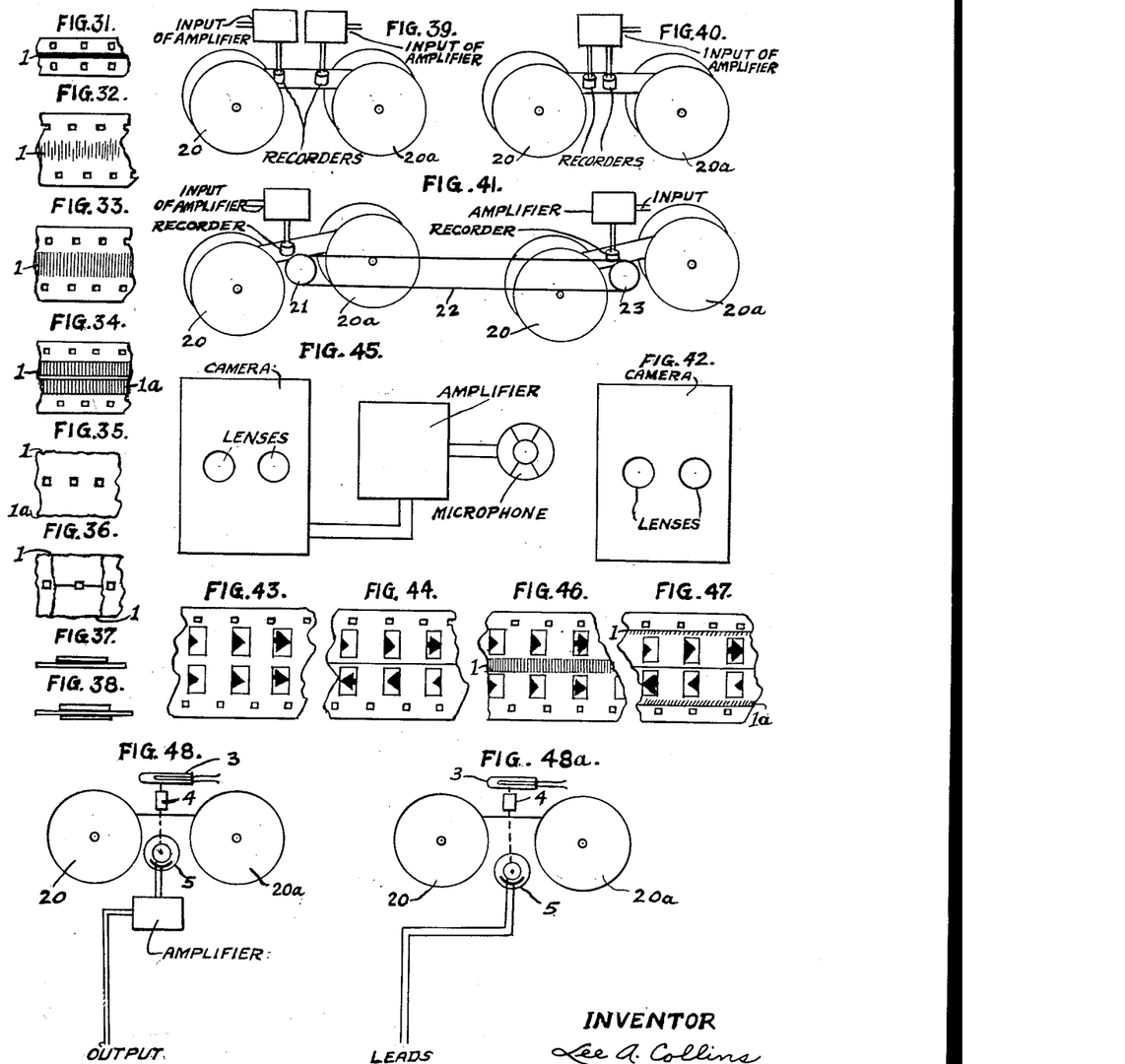

Figure 31 illustrates a record which may be of sound or picture representations made of sufficient width to be severed into two or more separate records for reversing the respective ends for making records of the present invention. This record may be made photographically on a photographic film; or material having electro-magnetic properties, or it may be mechanically and electro-mechanically recorded, burned, chemically etched, or it may be made by any other methods in the art of recording. Such original records may be used for re-creating the renditions, or they may be used as master records from which other records are made, either by photographic printing onto a positive film, or by any of the other duplicating methods and means. This drawing is illustrative only, like other such drawings herein, but it is to be understood that both sound and the component parts of the pictures may be made of variable width, variable density, variable thickness, horizontal curves or waves of uniform width, vertical or hill and dale effect, and by all other shapes, combinations, and effects that are too numerous to illustrate.

Figure 32 illustrates one of the several types of variable width records made of sufficient width so it can be severed for reversing the ends and using as a master record, or for direct reproduction in the same manner as in the record in Fig. 31.

Figure 33 illustrates a wide variable density record capable of being severed into as many records as desired, depending on the adjustment width made for the photographic or other type recording mechanism. Each pair of records cut or stripped therefrom will have their respective ends reversed and used for the same purposes as the records in Figures 31 and 32.

Figure 34 shows how the records illustrated in Figures 31, 32, and 33 are severed into and reversed at the ends and mounted on a backing material, preferably transparent, for holding the two records in proper shape for reproducing, or for use as a master record in printing photographically, or otherwise making duplicates therefrom. The backing material is optional since the two records can be held in proper place by sprocket wheels and other means for duplicating. Also, the records may be held between a transparent strip and against a positive film for holding in position without the necessity of glueing to a backing material. It is to be understood that duplicate prints and other types of duplications may be in reverse print and reverse matrix, respectively, to the original records, or they may be duplicated by printing methods and other means in order to be exactly like the finish of the original record, for both negative and positive types of records have special uses in the various arts to which they will be applied. These methods of producing duplicate records are applicable to all the records in the drawings and specifications contained herein. Also, it is to be understood that a multiplicity of the original records may be joined or placed side by side and arranged to run opposite each in order to carry out the arrangements and the combinations of records shown on one surface and two surfaces of the record materials shown in the various drawings and described in these specifications, and then they may be duplicated or photographically printed as a whole onto record media or films.

In lieu of single positive film records or other duplicated records containing a multiplicity of records side by side on one or both surfaces thereof, it is possible to have each of the records on separate materials held together side by side by suitable means such as a backing material for producing commercial records mounted on one or both surfaces of the backing material. In this case the records will be arranged in duplicated pairs as set forth for the single material. Either transparent or opaque backing material may be used, depending on the types of records mounted thereon. A transparent material is desirable when records are on one surface of a material and a light or ray source is projected through the records on to a light sensitive cell for reproducing, or for projecting moving pictures, but an opaque material may be used with records mounted on both surfaces thereof if the records are re-created by reflecting light from the record on to a light sensitive cell or to picture projecting means. Other types of records may be mounted on either transparent or opaque backings. The use of such backing materials are secondary to records on single material for a final or commercial record or film, but they have advantage in arranging for negative or original record for producing other records therefrom. The sprocket holes have been cut off of the records in Figure 34 since the backing material has such holes.

Figure 35 shows a record having the edges cut out in accordance to recordings. They are produced by a cutting tool stripping away the recording that may be produced photographically or mechanically; or by direct cutting, burning, etching chemically, depositing against the edges and by other means during recording.

Figure 36 shows the record 35 cut into and with the ends reversed and mounted on a backing strip for producing a record capable of being reproduced by projecting light near the edges for being altered by the uneven edges which act as minute shutters for varying the amount of light reaching a light sensitive cell controlling re-creating means. Also, it may be reproduced mechanically, electro-mechanically, by air jet means and other methods. Again, it may be blackened as a whole or in part and used as a master record for printing photographically therefrom on to positive photographic films for producing high quality records.

Figure 37 is an edge view showing a backing material for holding the records when arranged side by side.

Figure 38 is an edge view of a backing material holding records mounted on both of its surfaces.

Figure 39 is a perspective view illustrating two recorders for registering photographically or mechanically on a roll of record material, driven by suitable means at proper speed, two identical renditions side by side. The input leads may be in circuit with sound microphones, or picture translating means, or wired circuit from a distant point, or radio and television sending stations, or co-axial cable hook-up from such stations, or radio-frequency receiver receiving radioed sounds, or television apparatus receiving pictures from distant sending stations, and from local television analysis apparatus for registering on to the records. These leads connect direct with the amplifiers which have leads to recorders which represent photographic and other type recorders for registering simultaneously two identical renditions. Any desired number of the recorders may be added when more than one set of records are required for a greater number of the records. The reels 20 and 20a wind and unwind the roll of record material. The records are stripped and reversed to produce the various types of records described in the aforesaid specification and drawings.

Figure 40 is a modification of Figure 39, using a single amplifier for the input.

Figure 41 illustrates the recorders in Figure 39 separated and each making separate records simultaneously at proper recording speeds. The source of motive power can move both records simultaneously by proper coupling or gearing. The finished records are reversed and held opposite each for use in reproducing, or for use as master records for making duplicates, preferably on one film. Synchronization is by 21, 22 and 23.

The record materials in Figures 39, 40, and 41 may each be provided with suitable sprocket holes for running by sprocket wheels driven by a motor geared or otherwise coupled and stabilized by a fly wheel or pulley wheel of large size.

Figure 42 illustrates a moving picture camera with two lenses for making two sets of pictures simultaneously.

Figure 43 illustrates a film having two sets of pictures made by the camera in Figure 42.

Figure 44 illustrates the film in Figure 43 cut along the line and with the ends reversed and mounted on a backing strip for embodying the present invention. It may be negative film for making other picture films therefrom, or it may be a positive film that has been severed and joined after being printed from the film in Figure 43.

Figure 45 illustrates the camera in Figure 42 with a microphone leading to an amplifier which has leads to suitable sound photographic or recording means inside the camera for producing a wide sound record between a double set of pictures shown in Figure 46.

Figure 47 shows a film of Figure 46 after severing on a line and reversing the ends in order to produce two identical sound recordings running in opposite directions and relating to the two sets of identical pictures running in opposite directions. It may be either a negative or a positive film made in like manner as film in Figure 44. The sprocket holes in Figure 46 have been cut away in mounting on the backing in Figure 47 which has sprocket holes, but they may remain in the film if desired. If desired, the camera may have two sets of sound photographing apparatus therein for making simultaneously two sets of sound records along with the two sets of pictures, and then the film is severed through the center for reversing the ends for making records of the present invention.

Figure 48 illustrates diagrammatically how sound is reported from a film or other record material having records of the present invention in single pair or multiple pair. The record is moved along in uniform speed by means of any suitable number of sprocket wheels and rollers, or their equivalent, which engage the record material causing it to wind on reel 20 and unwind from reel 20a, or vice versa. An arrangement such as a split pulley and a slip belt will cause the reels to wind properly as the reproduction takes place. A motor driving a large pulley wheel serving as a fly wheel is desirable for moving the sprockets along by means of direct shaft connection, or by gearing, or by belting. The numeral 3 indicates a steady light source for projecting through an optical system 4 for directing rays in desired area to the sound record and to the light senstive cell 5 in electrical connection to an amplifier having an output which may lead either to a local speaker of any desired type, or a radio broadcasting equipment, or a co-axial cable or other wired circuits. Likewise, when the records are of television or picture representations in record form similar to sound records, the output will lead either to a local television receiver for translation back into picture images, a television sending station, a co-axial cable, or other wired circuit. Other translating and reproducing effects may be obtained from either the sound or picture records for various purposes. The output may lead to a glow lamp or oscillograph for re-transmitting purposes and the like. As before stated, when the records finish a rendition its duplicate is ready for playing without rewinding. The reels 20 and 20a may be changed, or they may remain in the positions shown in the drawing and the running speed of the motor reversed to wind back onto the reel that is unwound. A suitable housing is provided for the light source and the light sensitive cell but are not shown in the drawing.

Figure 48a is the same as Figure 48 except the amplifier is omitted for using in connection with sending stations and other equipment having amplifiers in their circuits.

Figures 49, 50:
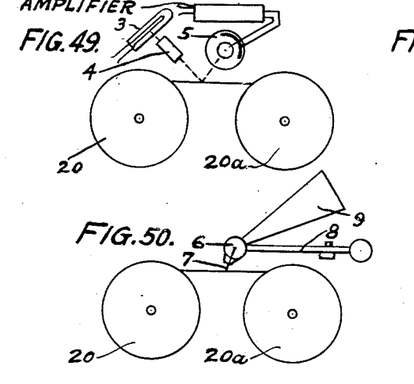

Figure 49 is the same as Figure 48 except in the arrangement for projecting the light source on to a record of suitable type to reflect the rays onto the light sensitive cell 5.

Figures 49A, 51:
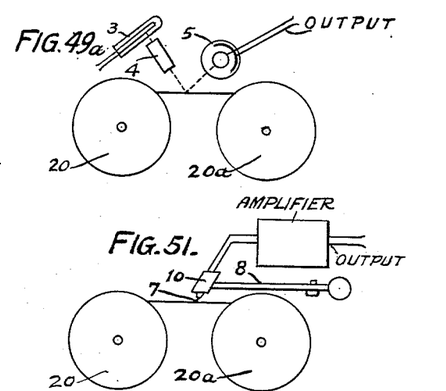

Figure 49a is the same as Figure 49 except the amplifier is omitted for the same reason given for Figure 48a.

Figure 50 illustrates diagrammatically a mechanical reproducer 6 having a needle 7 and a movable arm 8 which is pivoted and hinged to give freedom to the needle as it reproduces sound from the mechanical groove record strip. It is provided with a suitable horn or sound chamber as indicated by 9. The duplicate records may be played by changing the reels, or by reversing the speed of the motor as described in Figure 48.

Figure 51 illustrates diagrammatically an electro-mechanical reproducer 10 having leads to an amplifier, and the output may be used for all of the purposes set forth in reference to Figure 48. The needle 7 follows the grooves of the mechanical record and the arm 8 allows free movement of the reproducer as in Figure 50.

Figure 51A:
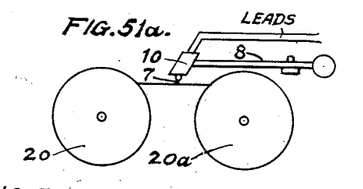

Figure 51a is the same as Figure 51 except the amplifier is omitted for the same reason set forth in reference to Figure 48a.

Figure 52:
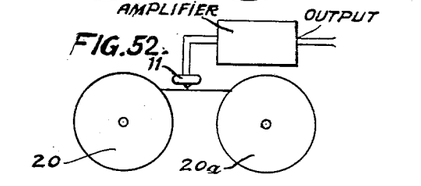

Figure 52 is illustrative of modified types of sound reproducers among which are telegraphones using varying magnetic properties for reproducing. Likewise these records will be in duplicate and run in opposite directions. Regardless of the type of record used the reproducer is preferably in circuit with an amplifier having an output for the various kinds of re-creations.

Figures 52A, 53, 54, 55, 56, 57, 58, 59, 60:
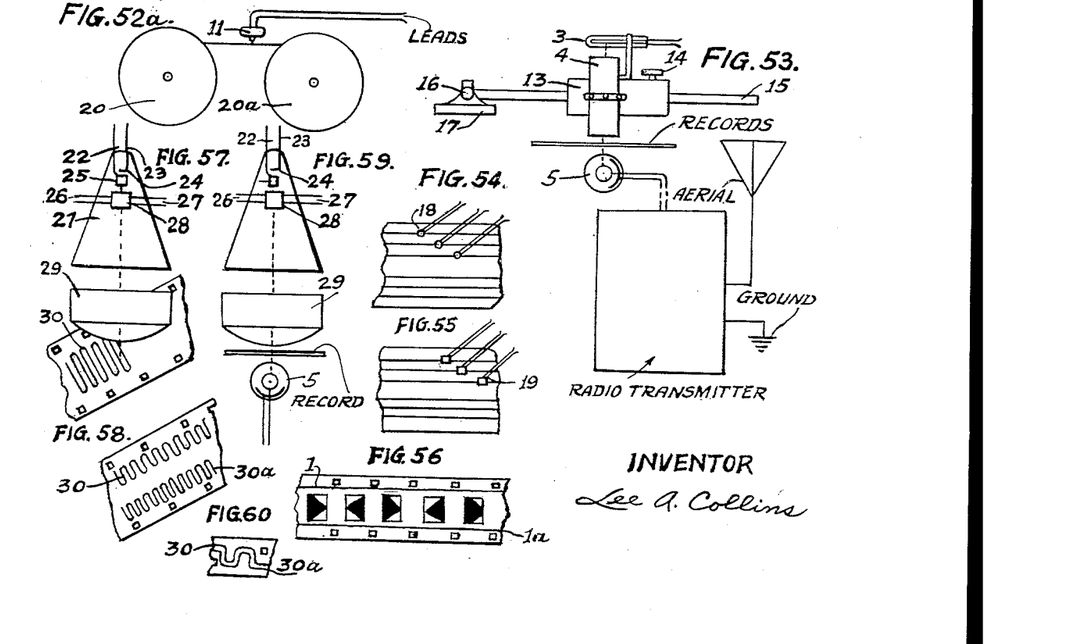

Figure 52a is the same as Fig. 52 except the amplifier is omitted for the same reason set forth in reference to Figure 48a.

Figure 53 is a side view illustration showing a sliding holder suitable for holding the optical system 4 and light 3 in Figures 48 to 49a inclusive, and in Figures 49 and 49a it may also hold the light sensitive cell 5. Also, the sliding holder is suitable for holding the reproducers or their arms shown in Figures 50 to 52a inclusive. The sliding holder is not required in re-creating a single pair of records on a strip, but it is advantageous when the strip or film has a number of pairs for sliding over the respective record to be reproduced. In the case of the light system reproduction the optical system 4 and the light 3 are mounted on a block 13 by suitable means. The block is drilled or channelled for sliding over the slide 15 which is hinged or pivoted at 16 to a block 17. The set screw 14 holds the sliding block 13 in any desired position along the slide 15 which may have markings thereon to indicate the respective points for the various records. The hinged joint 16 enables raising the whole unit for convenience in threading and removing the records. The Figure 53 shows the record in end view and with the light sensitive cell 5 independent of the sliding holder, but it is possible to have an extension member holding the said cell to the slider block for moving both simultaneously. The usual light housings are omitted in this drawing, but they may be used when required. The transmitter shown is for optional use.

Figure 54 illustrates diagrammatically how a number of records may be made close together and also by a slight overlapping, for several purposes. Either photographic or other types of recorders may be used and they are indicated by the numerals 18 shown in staggered formation. Separate circuits lead to each recorder from microphones or from the output of the radio, television receiver, coaxial cable, or from wired circuits coming from a distance. When a television picture formation is received it will give high definition by close joining or the slight overlapping of each of the records thus providing pictures of super quality. In the case of sound recordings and reproductions it will enable a greater number on a single record material, and, if desired, they may be separate recordings of various musical instruments and other sounds produced simultaneously by an orchestra and other means for producing high quality reproduction by playing all of the records simultaneously. Also, each of the photographings or recordings may be individual picture recordings of the continuous join type similar to sound recordings. The recorders may be started by proper control means to enable each of the recording lines to start at the same or even starting point, but it is not required in the case of sound and picture recordings not having the full picture width and area. If desired, the separate records may be severed apart and duplicated for separate use, or they may again be joined and mounted as described in reference to Figure 34. It is desirable to start and end the records even when they are rejoined after severing and arranging in duplicate and reversed order. When all of the recordings are of the same rendition it is possible to join all of the circuits from the recorders to the same leads from an amplifier, radio station, etc., but it is desirable to have more than one amplifier and microphone leading to the recorders when an orchestra and the like make the records within close range of the apparatus in order to give high fidelity of the various instruments or persons producing the sounds. The same recording methods can be applied to television recordings. The drawing shows duplicate records made by recorders indicated by the numerals 18 on the opposite side of the first set of records in an opposite direction along the film, it being accomplished by running the record material in an opposite direction after the finish of the first recordings. This latter method is optional since it has been stated before that the first records made may be duplicated by printing, molding, etc. and then reversed. In the case of making either single or several recordings in one direction and then again making them in the opposite direction along the same record material it becomes necessary to reenact the renditions, or record them from the first made, or from a duplicate of the first made. Also, when desired, the records may be on both surfaces of the material. While the drawing does not show the recordings close together or overlapping, it will be understood that the recorders being in staggered arrangement are capable of being shifted in a cross-wise direction to various degrees to effect close proximity or overlapping of the recordings. Furthermore, any desired number of the recorders may be used, the number depending on the number of recordings desired side by side or overlapping. Also, more than two sets of records running in opposite directions may be on the same record material for the purposes set forth in these specifications.

Figure 55 illustrates reproducers in staggered formation for recreating or translating the various kind of records made and retained in staggered formation by the recorders in Figure 54. The numeral 19 indicates the reproducers which may be of any suitable type to re-create or translate the different classes of recordings for the various purposes set forth in these specifications. The leads from the reproducers may lead to separate re-creating means, or they may all be joined and lead to the same re-creating means if they are all of the same recording. It will be understood that the number of reproducers may be increased to the number of recordings if all are to be reproduced simultaneously, and that the reproducers will be shifted cross-wise to correspond to the spacing or joining of the recording lines in like manner to the arrangement of the recorders. Furthermore, if desired, the staggered reproducers can reproduce from recordings in an even line at the starting if the renditions are different and do not require simultaneous starting and ending as will be understood in applying it to the various uses set forth in these specifications.

Figure 56 shows moving pictures alternated and running in opposite directions along the record material. A moving picture machine intermitting movement constructed to move two pictures per movement and having only one picture aperture plate and lens shows either set of pictures in exact order in projecting. A similar action of the negative film in a moving picture camera is effected in making images on every other frame at each intermit. A mirror or prism arrangement may be provided for reversing one set of the pictures upside down to the other set of pictures simultaneously as the filming takes place, and it may be effected by one or two lenses. Also, it is possible to make several sets of different pictures together in the same running direction and then make an identical number for reverse running direction and alternate them accordingly along the length of the film, but single pictures alternated in reverse running is preferred and shown in the drawing. Several other methods are provided for making films in reverse running order. The Figure 56 shows two identical sound records 1 and 1a running in opposite directions along the record material and relating to the pictures. If desired, additional picture and sound records may be made on one or both surfaces of the film; and by joining with other film as herein described. Furthermore, the picture records may be without the sound records when silent are desired. A picture film of this type requires one half the width of material for the picture space and about one third more in length than other types of sound and picture records combined and shown in the several drawings. This effects a considerable saving in material costs and greatly improves the sound recording and reproduction. It is a well known fact that silent moving pictures are made and projected at sixteen picture frames per second while pictures combined with sound are speeded to twenty-four frames per second in order to give the required speed for fair sound recording and reproduction. Assuming that the pictures are shown at the rate of sixteen per second in using a film of the type shown in Figure 56, then the actual speed of the film is at the rate of thirty-two pictures per second which gives a greater speed for sound recording and reproduction, thus resulting in higher fidelity re-creations than is possible with a film running at a slower speed. The speed gained for the sound recording and reproduction is highly advantageous since faint sounds otherwise lost will be faithfully recorded and reproduced. Furthermore, it may be found desirable to run the film at different speeds to suit the various requirements. As above stated several methods may be employed in making the films bearing the pictures, another one being the use of two lenses on the camera in vertical order or one above the other instead of using them side by side as shown in Figures 42 and 45. The intermit mechanism or claw movement in the camera will run the film two picture frames each time the shutters close and the lenses will make two pictures of like kind each time the shutters open. The two pictures of like kind will be developed and fixed and each will face or run in the same direction in the series along the length of the film. This negative film may then be used for making other prints in alternate running and reversed running for each of the two pictures of like kind by shielding every other one of the pictures in printing onto a positive film. The movement of the film may be at the two picture intermit speed and at the finish of the first set the positive film will be reversed and the aperture plate shifted one frame, or the films may be shifted one frame, and then the second or duplicate set of pictures will be printed in reversed order on the intervening spaces left from the first step in printing. In another method the developed negative film is severed apart at each of the pictures of like kind and then reversed and held securely for printing onto a positive film for use in effecting re-creation from both ends of a film the same renditions. The severed parts of the negative may be mounted on a backing material in several arrangements to suit the requirements. Another method is to use a single lens of the regular type in making the pictures and then develop and fix the negative, then print them onto a positive film running at twice the picture frames as the negative film is running in the printing. This is accomplished by a double picture frame intermit, or claw movement for the positive film running and a single picture frame movement for the negative film. Both mechanisms may be geared together to move in unison. The result will be intervening spaces of one picture frame on the positive film at the finish of the running of the full length of film through the printer, then the positive film is reversed and set so the alternate spaces left at the first printing are now printed to produce a film in reversed running order for images as shown in Figure 56. Still another method is to take the pictures at the double picture frame intermit movement with only an aperture plate for one of the frames which results in a finished negative film having one set of pictures made by a single lense camera. There will be space of at least one picture between each of the pictures and in the printing onto a positive film a similar intermitting movement is used as in the making of the negative film which results in a positive film having one set of pictures with similar space between each of the pictures. After this first step in printing the two films are arranged in reversed running order to each and shifted one picture frame to effect printing of the same set of pictures on the unexposed spaces on the positive film. Also, with the use of a camera having double picture frame intermitting movement and an aperture for only one picture frame of each double frame movement it is possible to re-thread the film through the camera at the finish of the first filming and again make a set of pictures on the alternated spaces left from the first filming. The second set of pictures are preferably the same as the first set when made in reversed running order, but they may be different and then a duplicate can be made of both and arranged side by side as described for making records not alternated between each. Still further duplication, or, different pictures may be made side by side, but it is preferable to make only a single width of images or pictures with the duplication alternated between each. Sound records may be simultaneously with the making of the pictures. or, they may be added later by proper shielding methods for the pictures already made, and they may be on the negative or positive film in the original making. Furthermore, they may be super-imposed on the pictures, or, the pictures super-imposed on the sound records by methods already described for super-imposing. The sound records are preferably on opposite edges of the pictures but they may be arranged in other suitable ways. Also, pictures may be without sound records.

It is further contemplated, whenever desired, especially in the making and showing of small moving picture films under the 35 m. size, to alternate more than two sets of images between each in order to provide ample space for recording and recreating more perfected sound records alongside, or, super-imposed therewith as already described. A single moving picture program with its duplicate alternated between in reversed running order will give twice the distance now afforded for recording of sound records alongside and will greatly improve the recording and re-creating of the sounds. Assuming the film is of the 8 m. size then it is equivalent to a 16 m. film in running distance for sound re-creating which falls short of the now standard 35 m. film used for theaters and the like, therefore, in order to give high quality sound recording and re-creating it is necessary to alternate more than one set of images between each. For this reason, the invention of alternated images is not limited to two sets of pictures. Furthermore, it will be understood that alternated pictures may be on one side of the film, or they may be alternately made on opposite sides of the film for the various applications. It is apparent that the film shown in Figure 56 has the advantages set forth for the other picture films and sound combinations shown in the various drawings in addition to the further improvement in the sound quality, but the other types of records may be used with re-creating apparatus at the present running speeds. It will be understood that other methods may be used in making the negative films and later printing onto positive films, among which is turning the moving picture camera upside down and changing the aperture plate one picture frame and reversing the running of the film for making the second set of pictures at alternate spaces between the first set when the double intermit movement is applied to the camera. Also, the negative film may be shifted one picture frame and the frame mounted in stationary position. In either of the two methods of alternating pictures it is also an intent to make pictures without turning the camera upside down when they are to be used without reversing as has been described, especially when two or more duplicate sets of alternated pictures are finally made by any of the several methods described, with and without sound.

Doubling the usual claw movement stroke in a moving picture camera, or doubling the usual size of an intermittent sprocket in another type provides space between each picture frame for another set of pictures when the aperture plate is kept at standard size. Also, doubling the size of an intermitting sprocket wheel in a moving picture projecting machine without increasing the size of the aperture plate causes showing of every other picture on a film when a shutter is provided and timed to cut off every other picture during the rotating periods. Likewise, a similar shutter timing will be provided for the camera. In addition to these structures there are many other structures and changes which may be used in moving picture cameras and projectors for carrying out my methods of taking and projecting alternated sets of moving pictures as well as still pictures, newspage images, parts, and all other facsimile matter with and without sound recordings and reproductions.

Among the other means of taking and projecting alternated sets of images is doubling the shaft rotating speeds of cameras and projectors of the present standard types with shutters of correct dimensions to exclude film exposing and projecting of an alternated set of pictures as will be understood without further drawings. Furthermore, additional sets of alternated pictures may be made and projected by increasing the rotating speeds of the shafts in cameras and projectors, as may be desired, and the pictures may be moving or still facsimile as already pointed out.

A still further method of making alternated pictures is by fade in and fade out manipulating of a moving picture camera as will be understood. In this method and all other methods of making alternated pictures it will be understood that the speed of rotation of the film or other recording and re-creating media will be such as to provide good projection of pictures, and sound re-creation when included therewith. In other words, the speed of rotation should be greater when two or more sets of moving pictures are alternated with or without sound. Also, the speed should be greater when still facsimile is alternated thereon with accompanying sound whether related or unrelated.

In making alternated moving pictures or still facsimile it is also an intent to sever the images apart and mount on a backing material in a manner set forth for the method described in Figure 44, but there is a difference in the arrangement of the images as will be understood. In the inclusion of sounds they may be on the backing strip or film directly or on a separate media attached thereon, as may be desired. Such records may be used for master records for making duplicates therefrom, or they may be used for direct re-creation therefrom. Furthermore, such mounting may be advantageous in the alternated images, and the arrangement set forth in Figure 44, for relief effect purposes, especially, when the records are of great depth in registration or by later work thereon for producing relief effects in various ways. It will be understood that the images may be projected or viewed directly, depending on the sizes, etc. Furthermore, direct viewing is applicable to all types of records included herein when of sufficient sizes to make projection onto a screen unnecessary.

In the use of images in relief it is also an intent of the present invention to include two or more views of each image taken at different angles for the purpose of projecting or otherwise viewing as third-dimensional images. Duplicate sets, or more, may be made in alternate running or in parallel reversed running order in carrying out the various arrangements set forth herein. It will be understood that the images may be on one or both surfaces of a film or other material.

In making two or more sets of alternated pictures on a film or strip ordinarily used for single picture showings it is apparent that less space is left for accompanying sound records desired thereon, or, less width is allowed for the pictures thereon. However, this invention is not limited to using the conventional widths of films. If both picture and sound records are desired on the standard widths now used in talking picture films it is preferable to keep the pictures at the present standard widths and reduce the widths of the sound records alongside thereon, especially when only two records are on the film. High quality sound amplifying means make possible the use of narrower sound tracks but the invention is in no way limited to using narrow sound tracks since it is also possible to reduce the widths of moving pictures or still images on a film or other record.

It is also an intent, whenever desired, to make and project moving pictures, still facsimile, etc., embodying all of the methods and records set forth herein, with the greatest dimension of each view in running order, or lengthwise, to a film or other strip bearing them for increasing the recording space for sound records alongside, or, in coupled relation thereto. Such an arrangement provides still further space for sound records when the number of pictures projected per second, or taken per second, is the same as would be when they are arranged for taking and projecting with the shortest dimension aligned to the running length of a film of the conventional type. Furthermore, the running speed of a film or record may be the same as in the conventional type, and pictures taken and projected lengthwise will be of less number per second, provided, in moving pictures, the number of pictures registered per second is sufficient to keep up with motion without showing flickers in projecting. In other words, it is not an intent to limit the invention to certain speeds of rotation in using, but it is an intent to maintain the speed sufficiently to give high quality sound recording and reproduction.

All of the methods set forth herein for making and projecting alternated images are also applicable for use as methods in making records or films of the other types set forth herein whenever desired, or found advantageous, as uses may occasion with such other structures shown and described.

Alternated pictures for moving picture and still views, also, newspage and parts thereof and all other facsimile uses are shown and described in my patent application, Serial No. 249,059, filed January 3, 1939, in the United States Patent Office, but the methods of making such records in duplicate in the various ways set forth in the present application is new and patent claims are made. Also, claims are made for more than two sets of like records. The records may be with and without sound effects and they may or may not be related as already set forth. Furthermore, patent claims are made for the various forms of the records in addition to the methods of making and re-creating them.

All of the records of sound and images, both still and motion, described and shown in the present application have great usefulness in carrying out all of the methods of transmitting and receiving set forth in my patent application No.

249,059, both in sound and image combination uses and separately. Also, the records herein described and claimed may be used in single re-creation and in multiple re-creation for carrying out of all methods of transmitting and receiving set forth in patent application No. 249,059. With these uses and the uses already set forth herein it is apparent that the present invention has great usefulness in all fields of transmitting and recording and its uses are not limited to the fields enumerated.

It is apparent that the same methods disclosed herein as new and useful for making alternated moving pictures and still facsimile in duplicate, and still further multiplicity, as described, are also useful in making alternated moving pictures and still facsimile images not in duplicate as set forth in my patent application No. 249,059. Therefore, patent claims are made for alternated methods not in duplicate in the methods of making set forth herein in addition to claims for the methods of making in alternated duplication and other duplicate multiplication or additions in reverse running order. Likewise, the method of mounting images on a backing strip for both negative and positive films and all other uses enumerated is applicable for use without duplication in carrying out the various ways of making, projecting and otherwise viewing moving picture images, newsmatter, and all other facsimile for all of the purposes set forth for films in transmitting and receiving, and other uses, in my patent application No. 249,059.

Figure 57 is a side view of a cathode ray tube 21 having leads 22 and 23 for connecting to a television receiving set, or any suitable type of amplifier, etc., either of which may work or receive by wired circuit, co-axial cable, radio transmission or other intermediary means from a distance or locally. A beam of light passes from the cathode 24 and anode 25, thence through the transparent or partially transparent end of the tube, depending on the type of tube used, thence through a lense 29, or other suitable optical system, to a sensitized negative or positive film of suitable type for registering. A moving picture film having sprocket holes is shown in the present drawing in perspective view and it is preferably moved along at uniform speed by means of a single sprocket wheel and idler roller having a large flywheel having pulley groovings therein for belting to a motor for driving the shaft of the sprocket wheel, but more than one sprocket wheel and idle rollers may be used with the driving apparatus when a reel of film is used requiring coupling for taking up onto another reel for avoiding dragging or checking of the speed of rotation. Other rollers than sprockets may be used when plain film or other recording materials are used as will be understood. Also, the film or other recording medium may be moved along at intermittent speed by means of a moving picture intermitting sprocket and its structure, or by other such structures operating mechanically or electrically, and several types of electrically operated intermitting structures are shown in my patent application No. 249,059, which are suitable for use in moving the present film by local or remote control. A set of plates are housed within the cathode tube for moving the cathode ray beam in cross-wise position to movement of the film when it is moved along at uniform speed thus registering sounds as shown in the drawing. The speed of the rotating apparatus governs the spacing between each recording line and it will be understood that the recordings may be almost joined, joined, and spaced out to greater spacing than shown. Also, it will be understood that the shape of the connecting line or recording at both sides of the film depends on the speed of the film. Furthermore, it is possible to eliminate altogether the connecting registrations at both sides of the film by shielding, or by omitting the sensitized coating on the negative film in the making. In either case the cathode ray beam will sweep past the edges of the sensitized coating of the film before it makes return sweeps in recording. However, it is preferable to keep the lines or recordings joined at the edges, especially in the recording of sounds and image recordings similar to sound recordings not used for direct projecting. When images are recorded for direct projecting from a positive film made therefrom, or from the original film record treated to serve as positive, it is unnecessary to join the recordings at each side, as is understood in the art, but it is necessary that the lines each join close, or overlap, as may be preferred. The last method of registering images is not new, but it is an intent to combine with this method the method of registering sound records alongside thereof directly connected, also, with a spacing between when desired. Such sound records may be of a narrow width of any type as now used in the art of talking pictures, or, they may sound records cross-wise as shown in the present drawing, either joined or unjoined to the image records alongside. When the accompanying sound records are in crosswise recordings it is possible to include many times more the sound modulations than with a single sound track outstretched in straight line running to the film as now commonly used in the talking picture art. Therefore, it is possible to project, or otherwise view, the images on a film for longer periods of time, and, it can readily be seen that great advantage and saving of film and other record materials is accomplished. The cross-wise sound recordings will be re-created by a constant glow cathode ray tube sweeping in identical movements to the original in recording and the rays passing therefrom will shine or reflect onto a light sensitive cell having electrical connection to amplifier, or transmitting apparatus; in other words, the cathode ray tube is substituted for the usual stationary constant glow lamp now used in sound reproduction. Such cross-wise sound records accompanying image records have particular advantage in projecting still images of all kinds, and they may be related or unrelated. The images may be projected by the present methods and apparatus used in stereopticon and moving pictures. As before stated, the film may be moved along at uniform, or at intermitting speeds. The images used for direct projecting should be made and shown at intermitting speeds and in such instances the cathode ray tube will have its beam of light sweeped in two planes in recording the images, the numeral 26 shows two leads from two parallel plates in one plane while the leads 27 are from two parallel plates in right angle plane to the former two plates. Such functioning by a cathode tube is well known and further details are unnecessary. Also, it is to be understood that other types of tubes, oscillographs, etc., may be used for functioning in an equivalent manner. In the present drawing the four plates of the tube are indicated as a whole by the numeral 28, but the recording 30 is outstretched and made at uniform speed and only two of the plates are used. The combination sound and image records are not shown in this drawing since it is a purpose to register sounds and re-create them independent of image records, and, since it has been pointed out that both sound and image records may be joined in cross-wise recording the present drawing illustrates the working principle. However, the cross-wise record lines require joining or overlapping when they include images in order to provide good projecting and viewing. The same cathode ray tube or its equivalent will register both records when in combination, but it is also a purpose, whenever desired, to employ separate recording apparatus for the sound and image records. Also, the method will include making more than one set of image and sound records simultaneously on a single record material, or coupled materials. Furthermore, more than one sound or image record may be made simultaneously without combination. Still further arrangements of records made cross-wise may be in side by side arrangement as shown and described for the other types of records disclosed herein. Duplication and further multiplication may be carried out, and they may also be arranged in reversed running order when in duplication, etc.

Registering sound and images joined in the cross-wise method described in the above paragraph may be termed as inter-lacing, weaving, successive order, etc., as set forth in my method for transmitting and receiving forming a part of my patent application No. 249,059, filed January 3, 1939. On page 108 of this application the method of recording and reproducing sound records in to and fro movement is set forth in connection with images alternated between each. Also, separate use is set forth. Furthermore, such recordings are described as suitable for use with images not alternated, and still further uses are described including inter-lacing, weaving, etc., of both images and sounds and different programs of either kind as well as all other conceivable kinds of combinations. One difference between the present application and the application No. 249,059 concerning to and fro sound recording is the present application employs the related or accompanying sound recordings directly opposite the image or picture which has certain advantages over running them length-wise with a series of images or pictures, especially in still picture or other facsimile recording and projecting and direct viewing. One example being in receiving and recording a sound program by radio with the accompanying picture of the entertainer or entertainers, etc. Another advantage is in receiving news matter and registering it with the comments of a news commentator therewith for re-creation, the image being projected onto a screen from its record, also, directly viewed, and the sounds reproduced therewith. Many other uses are intended among which are comic strips and related sounds. Also, the sounds may be unrelated and purely for accompaniment. No limitation is to be placed on the many uses to which it is adaptable. Furthermore, such records may be used for re-transmitting over television apparatus, radio, wired-circuit, co-axial cable, and all other apparatus. Likewise, such records may be made and transmitted or otherwise sent only one time. Many other uses will be found in carrying out the methods set forth.

While the method and apparatus described in reference to Figure 57 is described in the above paragraph as particularly adapted to single still images or facsimiles with sound recordings therewith, yet, it is to be understood that this in no way limits the invention to be applied to a series of moving pictures or still pictures along the running length with the sound recordings in single track or in wide cross-wise recordings as previously set forth. Also, it does not place limitation to using sound records alone in cross-wise arrangement as has been set forth. Furthermore, the images may be made independent of the sound recordings, either by scanning apparatus or by moving picture camera or still camera and the sound recordings made simultaneously, and separate for later joining This arrangement will be carried out by using a cathode ray tube or equivalent apparatus for making the sound recordings. In any arrangement a series of images may be directly joined and the sound recordings opposite each may be directly joined, or either or both may not be directly joined. The re-creating may be by projecting the pictures onto a screen by a constant or steady source of light as in regular moving pictures, also, by re-creating into images by scanning apparatus connected to the cathode ray tube or its equivalent, as described, while the sounds may be re-created by a cathode ray tube and reproducing apparatus therewith when in cross-wise arrangement. When the sounds with the images are in single track then they may be re-created in the usual ways set forth for other records herein.

When images and sound records are made side by side by one or more cathode ray tubes or equivalent apparatus in the methods pertaining to the Figure 57 it is preferable to use a separate cathode tube or equivalent apparatus in re-creating the sound recordings in order to avoid delay in the to and fro sweeping movements of the beam of light as would be the case in using only one tube or other apparatus for re-creating both image and sound records. However, using only one re-creating tube, etc. will suffice when the records are being transmitted for recording purposes at a distant point, points, or, even locally. Likewise, it is preferable to use separate recording apparatus for making the original records. As before stated, it is also a purpose to make the image records by cameras in some uses and likewise, project them without scanning apparatus in the usual way for moving and stereopticon picture, also direct viewing uses. In the combination of cross-wise sound records with the non-scanning of images in photographing a single cathode ray tube or other scanning apparatus suffices for sound recordings both in the making and re-creating.

It will be understood that prints can be made of the records described for the Figure 57, both of sound and image combinations and separate, the same as with other types of photographic records. Also, duplicates and greater numbers of the records can be made in reversed running order in similar making methods as described for other types of records herein.

Figure 58 shows the record 30 of Figure 57 made in duplicate and reversed running order, indicated by the numeral 30a.

Figure 59 shows the cathode tube and lens of Figure 57 with a record of any of the types described in reference to Figure 57 for re-creating by means of the light beam passing through the record to a light sensitive cell 5. The light cell is capable of converting the light variations into variable current flow in the usual manner for transmitting by connection to radio or television transmitter, also, wired-circuit, coaxial cable and other means including local amplifying and re-creating apparatus, or recording apparatus. More than one light sensitive cell may be used, depending on the types and number of records on the film as set forth in the paragraphs above. Records in reversed running order as shown in Figure 58 may also be re-created or transmitted with the apparatus of Figure 59, and still further groupings of such reversed records may be thereon for individually re-creating, or, simultaneous re-creating and transmitting with a group of photo or light sensitive cells with the necessary apparatus as will be understood.

Figure 60 shows cross-wise recordings made between each originally. Also, such records may be printed or otherwise placed between from a single record by any of the methods set forth herein for duplication and by any other suitable methods. These records may be placed between in still greater numbers. In any arrangement and number of them the cathode ray tube or other scanning apparatus will be so adjusted that only one line will be re-created by any one scanner at a time, or, a series of scanners may be used spaced apart for re-creating each recording individually and simultaneously in a similar arrangement in arranging the recorders in Figure 54 and the reproducers in Figure 55, but the re-creating apparatus is different as will be understood. The records may be in reversed running order in any number as will be understood, also, re-creating in this method without duplication is new and re-creating is not limited to duplicated records alone.

Since one cathode ray tube or its equivalent can register or re-create a combination image and sound record of the types set forth in Figures 57, 58, 59 and 60, likewise, more than one set of such records in combination, or, either of the two may be registered and re-created by a single tube or other scanning apparatus in greater number. Such multiple recording and re-creating methods in no way prevent using the method of making single records of either kind.

A record having a grouping of sound tracks side by side may be transmitted to a distant point by radio, television apparatus, either through space or by co-axial cable or wire circuit, etc., by a single cathode ray tube or other scanning apparatus as illustrated in the Figure 59. Also, a grouping of images side by side may be transmitted in like manner. Furthermore, combinations of image and sound records side by side may be transmitted in like manner, and no limitation is to be placed on the number of either. Recording can take place at the receiving point which may be near, or at a distance, by using similar scanning apparatus for registering onto a sensitized film in the several ways set forth in reference to Figure 57. These records may be the same starting and ending paths or they may be in reversed running order in transmitting for receiving and registering. The sound records may be in regular lengthwise running order as in talking picture films, or, they may be in cross-wise recording in transmitting a group of them with the scanning tube or other apparatus. Duplicates can be made and reversed order arrangement made at a receiving point as set forth elsewhere in these specifications for making other types of records at receiving points. Such a method of transmitting two or more images and registering two or more images by using a cathode ray tube and other scanning apparatus is set forth in my patent application 249,059, the registering being more particularly pointed out in reference to Figure 30 of this application filed January 3, 1939, but the combination of sound therewith registered by the same tube or scanning apparatus is not disclosed. Neither is duplication of records in reversed running order disclosed. The improvements in the present application have many uses and patent claims are made as a part of this application.

Since two or more channels are shown and described as a part of my application No. 249,059 for sending two or more images simultaneously, two or more sound tracks simultaneously, and the two kinds simultaneously in various numbers and groupings, it is an intent of the present invention to apply the records herein for such uses whenever they present advantages. In such applications the records may be of any of the types shown and described herein, also, they may be in any suitable combination of the records described herein.

In using the various types of records of the present invention it may sometimes be desirable to transmit programs by the several means set forth with one type of record and record it at another point with another type of record. One example being a more durable record used in a radio or television transmitting station and a less expensive material used in a record for recording in homes or other receiving stations. Therefore, the several types of records disclosed for use in the methods of the present invention offer advantages individually for different re-creations. Again, a shorter record may be used for home recording while a long record is used in sending since an entire program is not always desired in recording in the home and other receiving points. The invention is not limited to recording programs at a distance, nor is it limited to making recordings of any broadcast or other transmission originally made by a record or records of the present invention. The purpose of the invention is for all kinds of recordings and re-creations of images and sound in addition to radio and television uses.

The invention has been described in many modifications among which is two different films, strips of other materials, etc., joined together by cementing the back side or surface of each, with recordings on the outer surfaces of each. A still further modification is to back two films or strips together without cementing but by other holding means such as stapling or otherwise fastening at one or more points along its length in order to permit the two materials to space out in running over sprocket wheels or other apparatus for enabling projecting a light beam through each film or strip in re-creating either. Otherwise, by cementing together, the re-creating would be by reflecting the light rays projected thereon onto a light sensitive cell as shown in Figures 49 and 49a, and which is not considered as perfect as direct projecting through a film onto a light sensitive cell. Each of the two separate materials containing the records will have the recordings in reversed running order and duplication to each, and these records may also be image records with sound records. Also, the records may be either sound or images separate. Re-creating is possible without rewinding at each finish. The projecting of images with such a film spaced or spread out in running through apparatus is more perfect than by reflecting light from the images thereon when cemented together. The film or strip in winding to a take-up reel will be in the form of two backed together, thus being the equivalent to the two cemented together, but having the advantages set forth for light projecting methods. However, when the records are of a type not using light rays for re-creating, such as mechanical sound records, electro-magnetic, etc., it is preferable to permanently join or back two separate materials comprising the unit. As before stated, the various types of records for carrying out the methods of the present invention offer advantages individually for different re-creations, but the records backed together or permanently attached are not preferable to single record materials. Such structural changes are cited in order to justify broad patent claims in addition to the individual advantages offered. Still further modifications may be made in the projecting arrangement of the two films in spacing apart such as curving the film in any desired shape for projecting at any desired angle to the running line of the film through the apparatus if such is found advantageous to projecting in straight plane or alignment of the running of the film or strip. The two, or more, separate films or strips in duplication and reversed order may also be used apart on opposite sides of the sprockets, or, on separate sprockets, etc., for driving in unison for accomplishing re-creating records in either running direction, along the film or strip in correct order.

It is apparent that wider sprocket wheels and rollers will be used in moving picture cameras and projectors when films are made of wider width than the present standard sizes, or, two or more sprocket wheels and rollers may be arranged side by side to form the equivalent. Where several images are recorded or photographed on a single film, or, several films coupled together on separate sprockets side by side on the same shafts, then it is possible to arrange individual filming and projecting apparatus to open and close at the filming and projecting of the respective sets of images. Likewise, similar apparatus may be provided when a group of different still images are filmed and projected side by side. In the case of one set of images side by side in duplicate and reversed running order then it is possible to project with a single lense system and a single aperture plate by re-threading the film at each finish from the opposite end with the surface of the film the same, provided the duplicate set of images are on the opposite side of the film in identical alignment on the same surface. Having the duplicate set of images on the same surface is paramount unless other adjustments and corrections are made in the film, camera, and projecting machine apparatus, but the invention is not limited to keeping the duplicated images on the same side of a film in side by side arrangement. A still further arrangement in running reversed running order films through a camera or projector is by reversing the running direction without removing the film from either apparatus and providing a separate system for each set of images with apertures and shutters for closing in proper timing, or by manual setting at each running of the apertures. Each aperture opposite each set of images will have a separate lense system, or a single lense system may be used with shifting or sliding means to position opposite the respective aperture manually, or automatically in the filming and projecting. The several sets of different images described for use in some of the films will have their duplicate sets in reversed running order as described elsewhere in these specifications, but, as will be understood, it will be found more practical to include only two sets of images side by side in duplicate running order, and, if desired, these images may be one half the width and then the film may be held to the standard width, especially when made on professional size moving picture film. Two sets of images on a standard width film makes it unnecessary to change sprocket wheels, rollers, etc., but the aperture plate will be smaller and the shutter adjustment changed to compensate for smaller sized images. Also, if desired, two aperture plates may be provided if the film is run in reversed order without removing at each finish. If any of the modifications in projecting in these several types of film there may be one or more sources of light for projecting to the separate sets of images.

While images may be reduced in sizes in order to fit two or more sets side by side on a standard width film, yet, it will not be practical to reduce them in standard or professional 35 m. film when the images are projected in large theaters. However, such reductions will have a wide field of usage in small halls, homes, etc. Therefore, it is contemplated to increase the sizes of films when necessary in duplicating sets of images side by side on the same or opposite surfaces of a film or other strip.

Additional sound units, or, a single sound re-creating unit may be used by properly adjusting in alignment to the correct set of sound tracks when more than one set of sound tracks are on a film with images, or, when sound tracks are without images. However, two sets of sound tracks running alongside of and relating to, or accompanying two sets of images, such as a duplicate set in reversed running order, will align properly each time it is re-threaded from opposite ends and no adjusting is required. One form of sliding arrangement for re-creating singly from a grouping of sound records side by side is shown in Figure 53, and it will be understood that it is also applicable in re-creating when a grouping of picture and sound records are side by side.

While direct light projecting through a film has been shown for re-creating sound records in cross-wise arrangement, yet, it will be understood that light may be projected onto such records for reflecting onto light sensitive cells for re-creating. The cathode ray tube or other scanning apparatus is used for the source of light in projecting onto the film for reflecting to the light sensitive cell. Likewise, images may be re-created or transmitted in lieu of direct projecting with a cathode tube or other scanner. Also, it will be understood that reflecting may take place simultaneously from two sides of a film or record having uses set forth for transmitting purposes, but the single surface records are preferable.

Cross-wise records of sound alone will greatly reduce the length of film or other material used and is highly advantageous when long programs are made. Likewise, they are advantageous with lengthy still facsimile records with sound alongside.

It will be understood that records made in cross-wise recording may also be super-imposed one on the other when advantageous in reducing the widths of records.

The cathode ray tubes shown and described in reference to Figures 57, 58, 59 and 60 for recording and re-creating will have oscillating or sweep circuit means joined to the leads 26 and 27, respectively, for actuating the cathode ray stream at desired speeds in sweeping. Also, they may be a part of the receiving amplifier unit of a radio or television receiver, etc., as will be understood. Synchronization and control of the sweep circuits may be from a distant point by any of the several well known means, or they may be controlled and synchronized locally by separate means. In local sound recording a microphone will control the input to amplifier apparatus controlling the modulating of the cathode beam, likewise, image registering means will have to control the input to the amplifier, and the controlling means for the sweep circuits may be a component part of the amplifier for simplifying the apparatus.

Since records may, if desired, be re-created simultaneously from both surfaces of a crosswise record, likewise, they may be made simultaneously on both surfaces. Also, two or more may be made simultaneously on one surface whenever advantageous. Such multiple making and re-creating on one or both surfaces of a film or strip has been described in reference to other drawings herein and the same methods are applicable to cross-wise records. However, as stated before, it is preferable to use records made on one surface of a film whenever possible to suit conditions, especially, if they are photographic sound or image records.

Whenever desired, multiple re-creating may take place from all types of my records for various uses, especially in transmitting to chain radio and television stations.

Images recorded on my records by scanning apparatus may be by more than one scanning line simultaneously for fast recording, by more than one channel, when desired, especially for moving picture transmission and television purposes.

If desired, more than one image of like kind may be registered successively along the same running path of each of any of the various types of my duplicate and multiple records. Registering images successively by repeating the transmissions is set forth as a part of my patent application No. 249,059, but duplicating such records in reversed running order after receiving in a single length is a part of the present application. Such duplicating of still and moving images, especially newspaper facsimile, is of great value and novelty for giving better reception when static and other radio interferences occur since one of several like images may be chosen out of the grouping as better for projecting or otherwise viewing, or, for re-transmitting.

All of my image records may be projected, or, reflected, onto light sensitive cells in any suitable grouping and circuit arrangements in transmitting by wire, radio, television, and other means. Furthermore, each recording line may have individual light sensitive cells. Also, a single light sensitive cell may be used when the records are of small size and satisfactory results are obtained. Likewise, sound records for re-creating from a source of light may have one or more of such light sensitive cells, as conditions may require.

All of my image records and the methods of making them are applicable to stereopticon moving pictures and still images, including all kinds of facsimile. In such effects two or more images of like kind are usually made opposite each and with focusing lenses at different angles. Duplication, and further multiplication, of such records in reversed running order may be carried out in any of the methods set forth, as will be understood.

All of my image records may, if desired, include colored images. Also, if found advantageous, the sound records may be in any suitable color or combination of colors. Likewise, various combinations of colors may be applied to image records individually and in combination.

When necessary for conserving space, or, for other reasons, it is possible to record sounds on either, or, both of the edges of a film having a sensitized coating. Also, prints may be made onto other films. Such records may be re-created in a manner described for the records in Figure 36, also, by light projected and reflected therefrom onto a light sensitive cell with proper shielding means on the edge of the film to avoid reflections from other parts of the film. Either edge of the film may be a duplicate of the other in reversed running order, or, if the film is of sufficient thickness it may carry two or more records on each edge. Again, only one edge may be used for records if it is of proper thickness.

Transparent and partially transparent sound records made mechanically and by other means for producing variable translucency and altering light projections through them, or, reflected therefrom are also intended for re-creating in my methods of duplicated records in reversed running order. Also, for still further numbers of records as described in my methods. Furthermore, all other types of records may be included among which is the mechanically impressed or indented record made on string, thread, etc., but which may be made on paper and other suitable materials with duplication alongside or on the backs, in similar number and grouping to other records described.

Greater widths of sound records and the number of image records is possible in making records for greater duplication in the methods described in reference to Figures 42 to 47, inclusive.

If desired, duplicate sound records may be made simultaneously by reflecting light variations by mirrors, as will be understood. Also, prisms may be used for such duplication. With either means it is also possible to originally make the records in duplicate in reversed running order by proper adjustment. Such methods require more actinic radiations in recording and are not preferred to the other methods of recording for general purposes.

My methods will also include the use of images of all kinds made other than by photographic means on a film or strip. It is also an intent to include images in relief in all types of the records when desired for special purposes.

All of the types of my image and sound records will be found advantageous for business records and for many other uses too numerous to state. And the image and sound records may be together, or, separate, as described for other uses. Also, the images may be projected, transmitted to other points, and viewed without projecting and transmitting.

Light-proof housings are provided for all sensitized films used in recordings unless they are used in a dark room. Likewise, the necessary means are provided to exclude extraneous light during re-creating of records by light sources and light sensitive cells.

The sliding holder shown in Figure 53 may also be used for holding recording apparatus when several records are made side by side. Also, it may be used for holding a lense in registering, and printing images side by side.

Although I have chosen particular embodiments of my invention for purposes of illustration, many modifications will at once be apparent in addition to the several modifications set forth herein. Also, it is apparent that records being transmitted from one station to another over wired-circuit may be slower than re-transmitting speed for pictures in television when re-transmission takes place later on. Such slowing of the transmitting speed over wired-circuit is a substitute for the expensive, if not prohibitive, coaxial cable for distance transmission of television images. The reception of the received television images is on a record of any suitable type which is re-created therefrom for television broadcasts through space, etc., within its range. And no limitation is to be placed on the number of stations in a network receiving the recorded images with and without sound. The full methods and apparatus for recording the images at slow speed and re-creating at faster speed over a television transmitter are subject to many modifications, too numerous to describe in this application, but the basic working will be understood by those experienced in the art of sound recording and re-creating which has relationship to the image records whether in sound-like records or in full area image records.

What is claimed is:

1. The method of producing a program record which comprises, recording the program on a strip of material then duplicating the recording on the strip of material so that the program record shall include duplicate programs on the same strip and that each program shall run in opposite directions on the strip.

2. The method of producing a program record which comprises, recording the program on a strip of material then duplicating the recording on the strip of material so that the program record shall include duplicate coextensive programs on the same strip so that each program shall run in opposite directions on the strip.

3. The method of producing a program record on a strip of material which comprises, recording the program on said strip while it is moving in one direction, and then recording a duplicate of the recording on the same side of the strip and coextensive with the first recording while the strip moves in the reverse direction.

4. The method of producing a program record on a strip of material which comprises, recording the program on said strip while it is moving in one direction with an intermittent motion, and then recording a duplicate of the recording on the same side of the strip and coextensive with the first recording, while the strip moves in the reverse direction with an intermittent motion.

5. The method of producing a program record including coextensive duplicate recordings which comprises, producing a master record, then reproducing the recording on a strip in duplicate on the program record material so that each recording shall be coextensive and run in opposite directions on said program record strip.

6. The method of producing a program record including coextensive duplicate recordings which comprises, producing a master record, then photographically reproducing the recording on a strip in duplicate on the program record material so that each recording shall be coextensive and run in opposite directions on said program record strip.

7. A program record strip including duplicate coextensive recordings on said strip, the recordings running in opposite directions so that a complete program of the recording may be started at either end of the strip.

8. The method of producing a program record strip which comprises, recording the program indications in one direction on the strip in spaced apart relation, recording the same program on the strip and in reverse direction so that adjacent indications of the program are interleaved one with the other to occupy the same linear space on the strip.

9. The method of producing a program record strip which comprises, recording program image indications in spaced apart relation, recording sound indications to accompany said image recordings, recording the same program image indication on the strip and in the reverse direction so that the adjacent image indications of the programs interleave one with the other to occupy the same linear space on the film strip, and recording the same sound indications in the reverse direction to accompanying the reverse image recordings.

10. A composite program record strip including duplicate coextensive recordings of sound and images, the recordings running in opposite directions so that a complete program of the recording may be started at either end of the program strip.

LEE A. COLLINS.